United States Patent
Sinclair et al.

(10) Patent No.: US 7,203,686 B1
(45) Date of Patent: *Apr. 10, 2007

(54) PARTITION JOIN IN A PARTITIONED DATABASE SYSTEM

(75) Inventors: Paul L. Sinclair, Manhattan Beach, CA (US); Kuorong Chiang, Cerritos, CA (US)

(73) Assignee: NCR Corp., Dayton, OH (US)

( * ) Notice: Subject to any disclaimer, the term of this patent is extended or adjusted under 35 U.S.C. 154(b) by 502 days.

This patent is subject to a terminal disclaimer.

(21) Appl. No.: 10/748,563

(22) Filed: Dec. 30, 2003

(51) Int. Cl.
*G06F 7/00* (2006.01)
*G06F 17/00* (2006.01)

(52) U.S. Cl. .......................... 707/100; 707/7
(58) Field of Classification Search ............. 707/1–10, 707/100–104.1, 200–205
See application file for complete search history.

(56) References Cited

U.S. PATENT DOCUMENTS 5,983,215 A * 11/1999 Ross et al. ..................... 707/2
6,665,684 B2 * 12/2003 Zait et al. ..................... 707/102
6,999,967 B1 * 2/2006 Ghazal et al. ............... 707/101

* cited by examiner

*Primary Examiner*—Hosain Alam
*Assistant Examiner*—Navneet K Ahluwalia
(74) *Attorney, Agent, or Firm*—Howard Speight

(57) ABSTRACT

A method for performing a join of a first table and a second table is disclosed. In one instance, each of the plurality of first table rows is grouped into one of a plurality of first table partitions. It is determined that a partitioning column of the first table is specified in an equality condition of the join. One of the plurality of second table rows is selected, and a partition number is generated for the selected one of the plurality of second table rows. For a second table row for which a partition number was generated, a first table partition with a partition number that matches the generated partition number is identified, and a product join is used to join the one or more first table rows in the matching partition with the selected one of the second table rows.

57 Claims, 10 Drawing Sheets

US 7,203,686 B1

PARTITION JOIN IN A PARTITIONED DATABASE SYSTEM

BACKGROUND

Data organization is important in relational database systems that deal with complex queries against large volumes of data. Relational database systems allow data to be stored in tables that are organized as both a set of columns and a set of rows. Standard commands are used to define the columns and rows of tables and data is subsequently entered in accordance with the defined structure. The defined table structure is logically maintained, but may not correspond to the physical organization of the data. For example, the data corresponding to a particular table may be split up among a number of physical hardware storage facilities.

Many users of relational database systems desire fast execution of complex queries against large amounts of data. Different physical types of storage, for example random access memory and hard drives, can incur different length delays. In addition, writing to memory or a hard drive is often slower than reading an equivalent amount of data from memory or a hard drive. The organization of data corresponding to tables defined in a relational database system may determine the number of writes and reads that are performed in order to execute a common query. If the data is properly organized, in responding to queries performance can be improved by taking advantage of that organization and searching only part of the data. If the data is not organized in any way, it will often need to be searched in its entirety to satisfy a query or copied and restructured into a useful organization.

Given a particular change in the organization of data, particular types of searches or other operations performed on the data may be adversely impacted in terms of efficiency if they are performed without any adjustment. Many factors must be addressed to adjust a search that is to be performed with respect to a new organization of data. Such factors include, but are not limited to, the manner in which the data is stored, the file system that identifies the location of the data and various other information about the data, and the desired outcome of the search. Failure to consider and address any one of those factors can result in an inefficient search.

SUMMARY

In general, in one aspect, the invention features a method of performing a join, including identifying a join that identifies a right table and a left table. The right table includes a plurality of right table rows. Each of the plurality of right table rows is grouped into one of a plurality of right table partitions. The left table includes one or more left table rows. The method includes determining that a partitioning column of the right table is specified in an equality condition of the join and preparing the left table for joining one or more rows of the left table with one or more rows of the right table. Preparing the left table includes selecting one of the plurality of left table rows and generating a partition number for the selected one of the plurality of left table rows. The method further includes, for a left table row for which a partition number was generated, identifying a right table partition with a partition number that matches the generated partition number, and joining, using a product join, the one or more right table rows in the matching partition with the selected one of the left table rows if one or more join conditions are satisfied.

Implementations of the invention may include one or more of the following. Preparing the left table for joining may include generating a spool of the left table. Preparing the left table for joining may include generating a partition number for each of the plurality of left table rows and sorting the left table rows by partition number. Preparing the left table may include placing the left table rows associated with the same partition number into a cache. The method may further include joining, using a product join, the one or more right table rows in the matching partition with the each of the left table rows in the cache if one or more join conditions are satisfied. Preparing the left table for joining may include duplicating the left table to each of the processing modules.

In general, in another aspect, the invention features a method of performing a join. The method includes identifying a join that identifies a left table and a right table. The left table includes a plurality of left table rows. Each of the plurality of left table rows is grouped into one of a plurality of left table partitions. The right table includes one or more right table rows. Each of the plurality of right table rows is grouped into one of a plurality of right table partitions. The method includes determining that the left table and the right table are joined on equality constraints and determining a relationship between a partitioning expression associated with the left table and a partitioning expression associated with the right table. The method further includes determining that each left table partition matches at least one right table partition based on the relationship between the partitioning expressions associated with the left table and right table and joining the one or more left table rows of each matching left table partition with the one or more right table rows of the at least one matching right table partition if one or more join conditions are satisfied.

Implementations of the invention may include one or more of the following. Determining that the left table and the right table are joined on equality constraints may include determining that the join specifies an equality constraint between each primary index column of the left table and a corresponding primary index column of the right table and determining that the join specifies an equality constraint between each partitioning column of the left table and a corresponding partitioning column of the right table. Determining the relationship between the partitioning expressions may include determining that a mapping of the plurality of left table partitions to the plurality of right table partitions is a one to one relationship. Determining that at least one left table partition matches at least one right table partition may include matching each partition of the left table with only one partition of the right table. Joining the one or more left table rows of the at least one matching left table partition with the one or more right table rows of the at least one matching right table partition may include performing a merge join. Determining a relationship between the partitioning expressions may include determining that a mapping of the plurality of left table partitions to the plurality of right table partitions is a one to many relationship. Determining that at least one left table partition matches at least one right table partition may include matching each partition of the left table with at least two partitions of the right table. Joining the one or more left table rows of the at least one matching left table partition with the one or more right table rows of the at least two matching right table partitions may include joining the one or more left table rows of each partition of the left table with the one or more rows of the at least two matching partitions of the right table. Determining a relationship between the partitioning expressions may include determining that a mapping of the plurality of left table partitions to the plurality of right table partitions is a many-to-many relationship. Determining that at least one left table partition matches at least one right table partition may include matching each partition of the left table with at least two partitions of the right table and matching each partition of the right table with at least two partitions of the left table.

In general, in another aspect, the invention features a method of performing a join. The method includes identifying a join that identifies a left table and a right table. The left table includes a plurality of left table rows. Each of the plurality of left table rows is grouped into one of a plurality of left table partitions. The right table includes one or more right table rows. Each of the plurality of right table rows is grouped into one of a plurality of right table partitions. The method includes determining that the join specifies an equality constraint between each primary index column of the left table and a corresponding primary index column of the right table and determining that inequality conditions exist between each partitioning column of the left table and a corresponding partitioning column of the right table. The method further includes determining that a mapping of the plurality of left table partitions to the plurality of right table partitions is a one to many relationship and determining that at least one left table partition matches at least two right table partitions based on the relationship between the partitioning expressions associated with the left table and right table. The method further includes joining the one or more left table rows of the at least one matching left table partition with the one or more right table rows of the at least two matching right table partitions if one or more join conditions are satisfied.

Implementations of the invention may include one or more of the following. Determining that inequality conditions exist between each partitioning column of the left table and a corresponding partitioning column of the right table may include determining that the inequality conditions comprise one or more inequality expressions and one or more expressions that are not inequality expressions.

In general, in another aspect, the invention features a method of performing a join. The method includes identifying a join that identifies a first table and a second table. The first table includes a plurality of first table rows. Each of the plurality of first table rows is grouped into one of a plurality of first table partitions. The second table includes one or more second table rows. The method includes determining that a partitioning column of the first table is specified in an equality condition of the join and preparing the second table for joining one or more rows of the second table with one or more rows of the first table. Preparing the second table includes selecting one of the plurality of second table rows and generating a partition number for the selected one of the plurality of second table rows. The method includes, for a second table row for which a partition number was generated, identifying a first table partition with a partition number that matches the generated partition number and joining, using a product join, the one or more first table rows in the matching partition with the selected one of the second table rows if one or more join conditions are satisfied.

In general, in another aspect, the invention features a computer program, stored on a tangible storage medium, for use in performing a join. The program includes executable instructions that cause a computer to identify a join that identifies a right table and a left table. The right table includes a plurality of right table rows. Each of the plurality of right table rows is grouped into one of a plurality of right table partitions. The left table includes one or more left table rows. The program includes executable instructions that cause the computer to determine that a partitioning column of the right table is specified in an equality condition of the join and prepare the left table for joining one or more rows of the left table with one or more rows of the right table. Preparing the left table includes selecting one of the plurality of left table rows and generating a partition number for the selected one of the plurality of left table rows. The program includes executable instructions that cause the computer, for a left table row for which a partition number was generated, to identify a right table partition with a partition number that matches the generated partition number and join, using a product join, the one or more right table rows in the matching partition with the selected one of the left table rows if one or more join conditions are satisfied.

In general, in another aspect, the invention features a computer program, stored on a tangible storage medium, for use in performing a join. The program includes executable instructions that cause a computer to identify a join that identifies a left table and a right table. The left table includes a plurality of left table rows. Each of the plurality of left table rows is grouped into one of a plurality of left table partitions. The right table includes one or more right table rows. Each of the plurality of right table rows is grouped into one of a plurality of right table partitions. The program includes executable instructions that cause the computer to determine that the left table and the right table are joined on equality constraints and determine a relationship between a partitioning expression associated with the left table and a partitioning expression associated with the right table. The program further includes executable instructions that cause the computer to determine that each left table partition matches at least one right table partition based on the relationship between the partitioning expressions associated with the left table and right table and join the one or more left table rows of each matching left table partition with the one or more right table rows of the at least one matching right table partition if one or more join In general, in another aspect, the invention features a computer program, stored on a tangible storage medium, for use in performing a join. The program includes executable instructions that cause a computer to identify a join that identifies a left table and a right table. The left table includes a plurality of left table rows. Each of the plurality of left table rows is grouped into one of a plurality of left table partitions. The right table includes one or more right table rows. Each of the plurality of right table rows is grouped into one of a plurality of right table partitions. The program includes executable instructions that cause a computer to determine that the join specifies an equality constraint between each primary index column of the left table and a corresponding primary index column of the right table and determines that inequality conditions exist between each partitioning column of the left table and a corresponding partitioning column of the right table. The program further includes executable instructions that cause a computer to determines that a mapping of the plurality of left table partitions to the plurality of right table partitions is a one to many relationship and determines that at least one left table partition matches at least two right table partitions based on the relationship between the partitioning expressions associated with the left table and right table. The program includes executable instructions that cause a computer to join the one or more left table rows of the at least one matching left table partition with the one or more right table rows of the at least two matching right table partitions if one or more join conditions are satisfied.

In general, in another aspect, the invention features a method of performing a join. The method includes identifying a join that identifies a second table and a first table. The second table includes a plurality of second table rows. Each of the plurality of second table rows is grouped into one of a plurality of second table partitions. The first table includes one or more first table rows. Each of the plurality of first table rows is grouped into one of a plurality of first table partitions. The method includes determining that the second table and the first table are joined on equality constraints and determining a relationship between a partitioning expression associated with the second table and a partitioning expression associated with the first table. The method further includes determining that each second table partition matches at least one first table partition based on the relationship between the partitioning expressions associated with the second table and first table. The method further includes joining the one or more second table rows of each matching second table partition with the one or more first table rows of the at least one matching first table partition if one or more join conditions are satisfied.

In general, in another aspect, the invention features a database system including a massively parallel processing system, which includes one or more nodes, a plurality of CPUs, each of the one or more nodes providing access to one or more CPUs, a plurality of data storage facilities each of the one or more CPUs providing access to one or more data storage facilities, a process for execution on the massively parallel processing system for performing a join. The process includes identifying a join that identifies a right table and a left table. The right table includes a plurality of right table rows. Each of the plurality of right table rows is grouped into one of a plurality of right table partitions. The left table includes one or more left table rows. The process further includes determining that a partitioning column of the right table is specified in an equality condition of the join and preparing the left table for joining one or more rows of the left table with one or more rows of the right table. Preparing the left table includes selecting one of the plurality of left table rows and generating a partition number for the selected one of the plurality of left table rows. The process further includes, for a left table row for which a partition number was generated, identifying a right table partition with a partition number that matches the generated partition number and joining, using a product join, the one or more right table rows in the matching partition with the selected one of the left table rows if one or more join conditions are satisfied.

In general, in another aspect, the invention features a database system including a massively parallel processing system, which includes one or more nodes, a plurality of CPUs, each of the one or more nodes providing access to one or more CPUs, a plurality of data storage facilities each of the one or more CPUs providing access to one or more data storage facilities, a process for execution on the massively parallel processing system for performing a join. The process includes identifying a join that identifies a left table and a right table. The left table includes a plurality of left table rows. Each of the plurality of left table rows is grouped into one of a plurality of left table partitions. The right table includes one or more right table rows. Each of the plurality of right table rows is grouped into one of a plurality of right table partitions. The process further includes determining that the left table and the right table are joined on equality constraints and determining a relationship between a partitioning expression associated with the left table and a partitioning expression associated with the right table. The process further includes determining that each left table partition matches at least one right table partition based on the relationship between the partitioning expressions associated with the left table and right table and joining the one or more left table rows of each matching left table partition with the one or more right table rows of the at least one matching right table partition if one or more join conditions are satisfied.

In general, in another aspect, the invention features a database system including a massively parallel processing system, which includes one or more nodes, a plurality of CPUs, each of the one or more nodes providing access to one or more CPUs, a plurality of data storage facilities each of the one or more CPUs providing access to one or more data storage facilities, a process for execution on the massively parallel processing system for performing a join. The process includes identifying a join that identifies a left table and a right table. The left table includes a plurality of left table rows. Each of the plurality of left table rows is grouped into one of a plurality of left table partitions. The right table includes one or more right table rows. Each of the plurality of right table rows is grouped into one of a plurality of right table partitions. The process further includes determining that the join specifies an equality constraint between each primary index column of the left table and a corresponding primary index column of the right table and determining that inequality conditions exist between each partitioning column of the left table and a corresponding partitioning column of the right table. The process further includes determining that a mapping of the plurality of left table partitions to the plurality of right table partitions is a one to many relationship and determining that at least one left table partition matches at least two right table partitions based on the relationship between the partitioning expressions associated with the left table and right table. The process includes joining the one or more left table rows of the at least one matching left table partition with the one or more right table rows of the at least two matching right table partitions if one or more join conditions are satisfied.

In general, in another aspect, the invention features a method of performing a join. The method includes identifying a join that identifies a second table and a first table. The second table includes a plurality of second table rows. Each of the plurality of second table rows is grouped into one of a plurality of second table partitions. The first table includes one or more first table rows. Each of the plurality of first table rows is grouped into one of a plurality of first table partitions. The method includes determining that the join specifies an equality constraint between each primary index column of the second table and a corresponding primary index column of the first table and determining that inequality conditions exist between each partitioning column of the second table and a corresponding partitioning column of the first table. The method further includes determining that a mapping of the plurality of second table partitions to the plurality of first table partitions is a one to many relationship and determining that at least one second table partition matches at least two first table partitions based on the relationship between the partitioning expressions associated with the second table and first table. The method further includes joining the one or more second table rows of the at least one matching second table partition with the one or more first table rows of the at least two matching first table partitions if one or more join conditions are satisfied.

DETAILED DESCRIPTION

Figure 1:
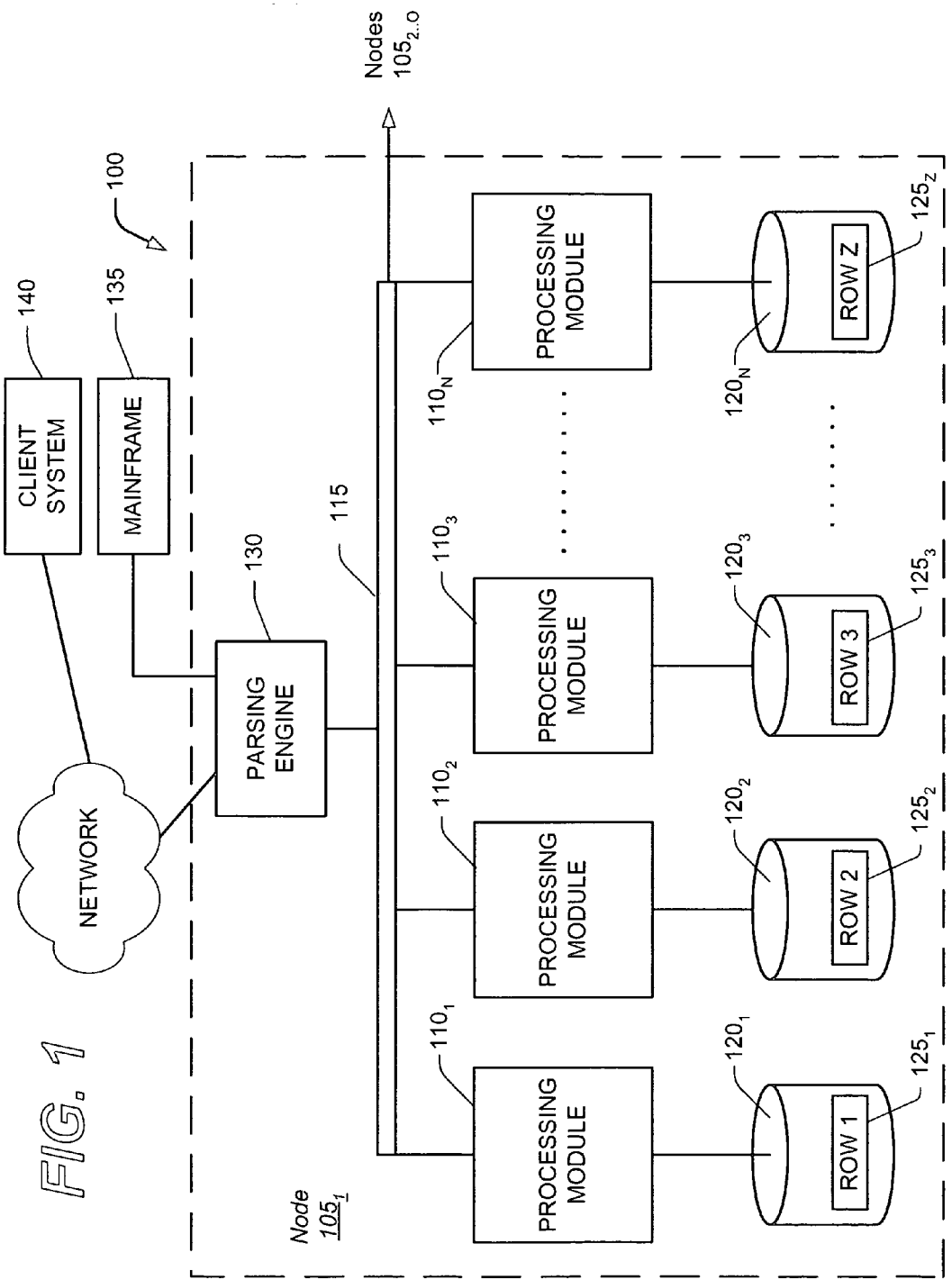
FIG. 1 is a block diagram of a node of a database system.

The join technique for a partitioned table disclosed herein has particular application, but is not limited, to large databases that might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots O}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBS 100 usually receives queries and commands to build tables in a standard format, such as SQL.

In one implementation, the rows $125_{1 \ldots Z}$ are distributed across the data-storage facilities $120_{1 \ldots N}$ by the parsing engine 130 in accordance with their primary index. The primary index defines the one or more columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1 \ldots N}$ and associated processing modules $110_{1 \ldots N}$ by a hash bucket map. The characteristics of the columns chosen for the primary index determine how evenly the rows are distributed.

Figure 2:
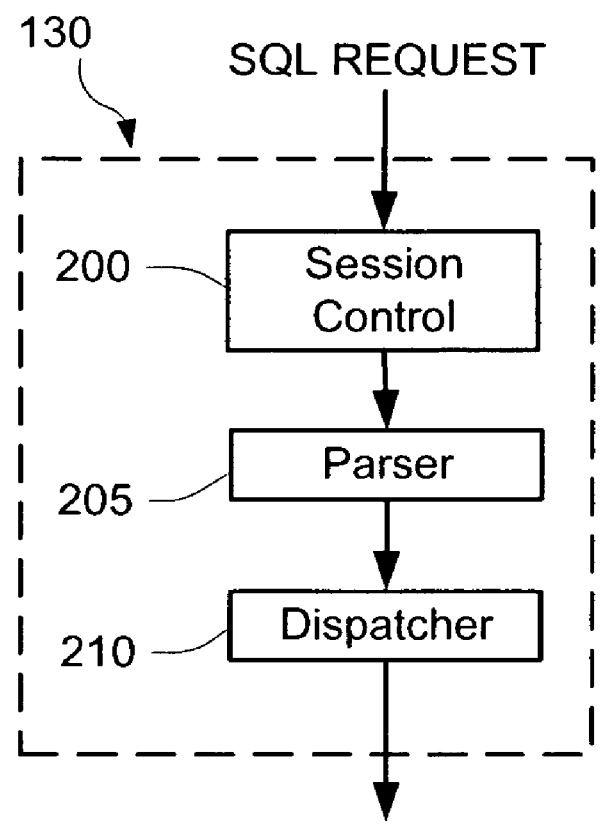
FIG. 2 is a block diagram of a parsing engine.

In an example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
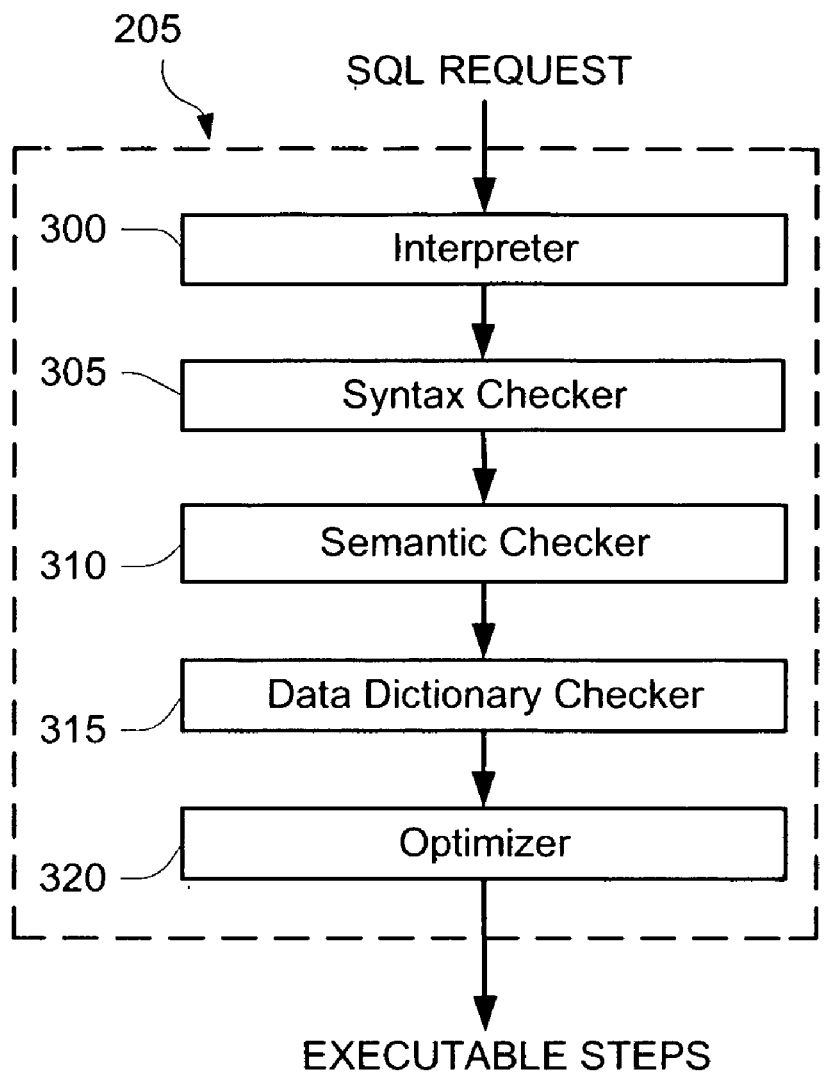
FIG. 3 is a flowchart of a parser.

Once the session control 200 allows a session to begin, a user may submit a SQL request, which is routed to the parser 205. As illustrated in FIG. 3, the parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). Finally, the parser 205 runs an optimizer (block 320), which develops the least expensive plan to perform the request.

Figure 4:
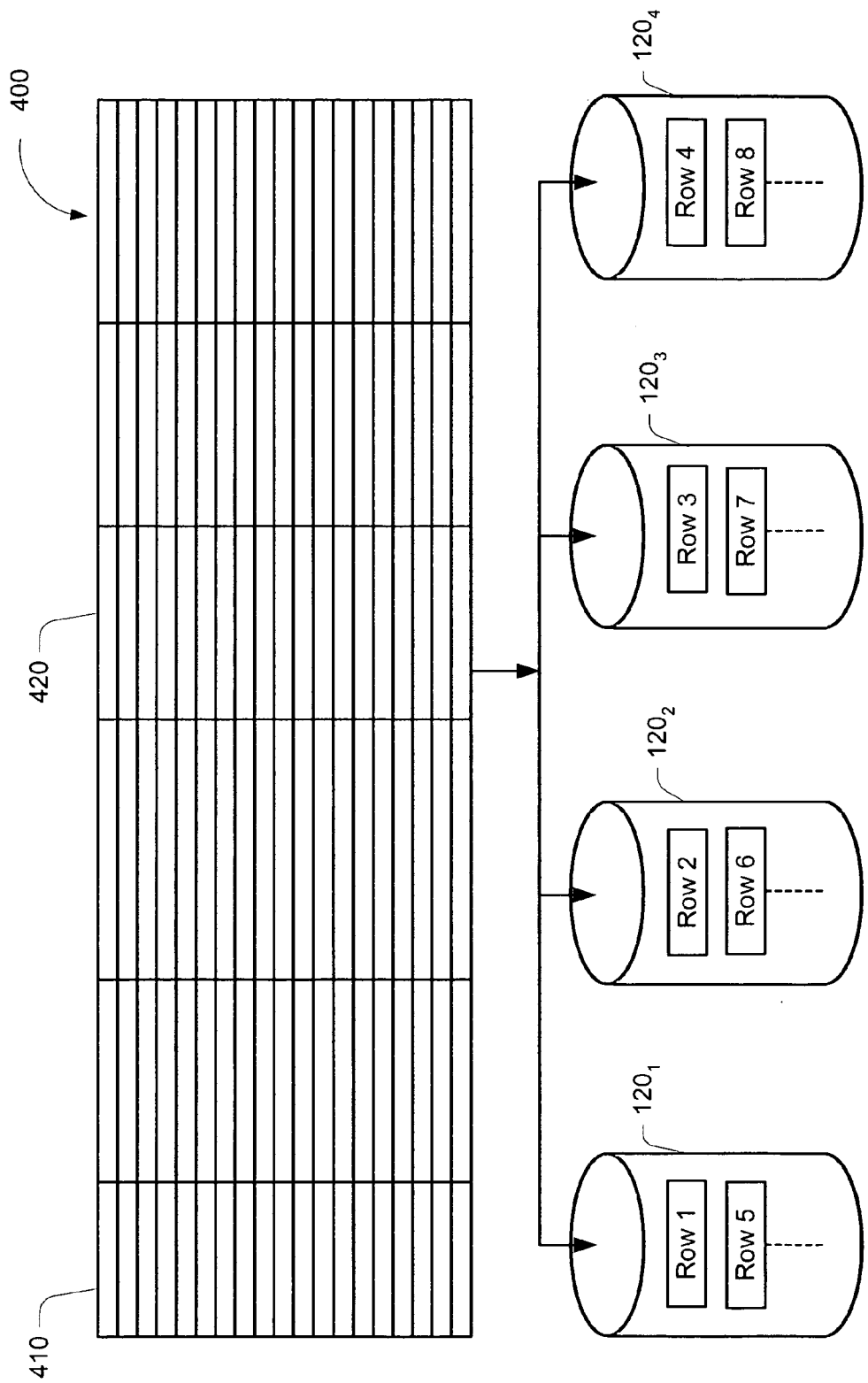
FIG. 4 is a flow diagram of a table distribution process.

FIG. 4 shows one implementation of how the rows of a table are distributed. The table 400 contains a plurality of rows and is stored in a plurality of data storage facilities $120_{1-4}$ by processing module 100 under the direction of parsing engine 130, as shown in FIG. 1. For example, two columns 410, 420 can be designated as the primary index when the table is created. The hash function is then applied to the contents of columns 410, 420 for each row. The hash bucket portion of the resulting hash value is mapped to one of the data storage facilities $120_{1-4}$ and the row is stored in that facility. For example, if the primary index indicates a column containing a sequential row number and the hash function is the sum of the value one and the remainder when the sequential row number is divided by four, the first eight rows will be distributed as shown in FIG. 4.

Queries involving the values of columns in the primary index can be efficiently executed because the processing module $110_n$ having access to the data storage facility $120_n$ that contains the row can be immediately determined. For example, referring to FIG. 4, if values from row 2 are desired, the parsing engine 130 can apply the hashing function to determine that only processing module $110_2$ needs to be used. As another example, an equality join between two tables that have the same primary index columns is more efficient at least in the sense that all of the rows that need to be joined are found in the same data storage facility $120_n$ and no movement of information between the facilities is necessary.

Figure 5:
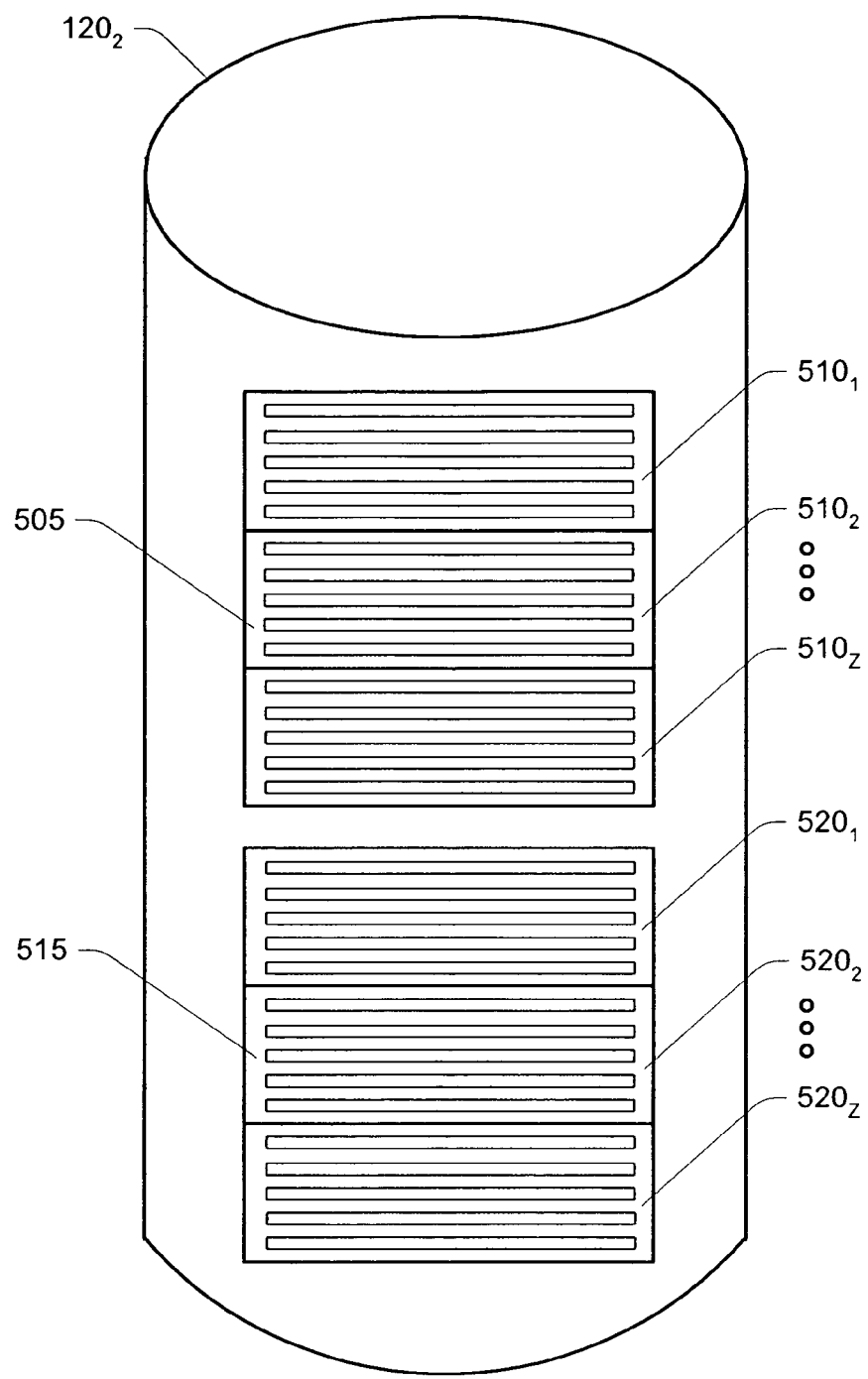
FIG. 5 illustrates an example of rows from two partitioned tables residing in a data storage facility.

While the primary index of a table can be chosen for equality joins, for example the order number column of an order table, additional design features can make range searches, for example a range of dates from the date column, more efficient. Referring to FIG. 5, a partitioned database storage facility $120_2$ is shown. Rows from two partitioned tables 505 and 515 are organized within the storage facility $120_2$ in accordance with a row identification (row ID), which can include values associated with a partition function as well as values associated with the hash function and a uniqueness value. The rows stored in each table 505 and 515 in storage facility $120_2$ are ordered at a top level by the result of the partition function. As a result, partitioned table 505 includes at least two groups of rows $510_{1-Z}$. Specifically, partitioned table 505 is illustrated as including a first group of rows $510_1$ having one partition function value, a second group of rows $510_2$ having another partition function value, and a third group of rows $510_3$ having a third partition value. The groups of rows $510_{1-Z}$ are ordered by their partition values and are also known as partitions.

Partitioned table 515 is illustrated as being similar to table 505. Accordingly, table 515 is illustrated as including at least two groups of rows $520_{1-Z}$ Specifically, partitioned table 515 is illustrated as including a first group of rows $520_1$ having one partition function value, a second group of rows $520_2$ having another partition function value, and a third group of rows $520_3$ having a third partition value. The groups of rows $520_{1-Z}$ are ordered by their partition values and are also known as partitions. Although table 515 is shown as a partitioned table, table 515 need not include a partitioned table. Accordingly, in various implementations that will be described in more detail below, table 515 may include a single group of rows 520 that is not partitioned.

Where tables 505 and 515 are partitioned tables, the rows are also sorted within each partition. For example, the first partition $510_1$ contains five rows. Those rows are stored within that partition $510_1$ in the order of the hash result for each row. The hash result therefore acts as a sorting value. A uniqueness value may also be maintained for each row. In one implementation, no two rows with the same partition and hash value in a table can have the same uniqueness value. The uniqueness values are determined when the rows are added to the table. For example, a sequential number (the next uniqueness number after the highest one currently being used) or any currently unused number can be used as the uniqueness value. If two rows are in the same partition and have the same hash value, their order is determined by their uniqueness values, which by definition cannot be identical. The uniqueness value does not play a role in ordering rows that have different partition or hash values. In another implementation, uniqueness values are not assigned to the rows and the order of rows with identical hash values is not determined. Since rows are ordered first by partition and then by hash value, all rows with the same hash value may not be together. Rows with the same hash value may occur in multiple partitions.

A partition function can return a number for a row based on the range of values into which that row's value in a certain column falls. For example, if an order table in a database has the order number column as that table's primary index, the partition function can correspond to the month of the order date. In that situation, the rows of the order table would be distributed to storage facilities based on the result of applying the hash function to the order number. In each storage facility, the rows would be ordered based on a monthly range of dates. For example, the first partition $510_1$ could include all rows for orders in January 2001. The second partition $510_2$ could include all rows for orders in February 2001. Within each partition the rows are in the order of the hash value and, where hash values are the same, in order by uniqueness value. Such a partitioned table could be efficiently searched on ranges by searching only those partitions implicated by the required search. For example, if all orders for a certain product during a two month period are desired, only two partitions would need to be checked for the specified product. The monthly range is just one example of a possible partition function. Any type of function can be used.

For one implementation of joining two tables or other data structures in a DBS 100, rows from table 505 may be joined with rows from table 515. Since rows stored in data storage facility $120_2$ are ordered first by partition and then by hash value for each table 505 and 515, all rows with the same hash value may not be together within each partition $510_{1-Z}$ and $520_{1-Z}$. Rows with the same hash value may occur in multiple partitions within data storage facility $120_2$. Because rows with the same hash value may occur in multiple partitions, the queries performed to join a partitioned table with another table (that may or may not be partitioned) may be more complicated than the queries performed to join two tables that are not partitioned.

The performance of joins of partitioned tables may be improved, however, when certain conditions are present. For example, performance of the join may be improved where there are equality conditions on both the primary index and partitioning columns of tables 505 and 515. For example, where tables 505 and 515 are partitioned using the same partition function and tables 505 and 515 are joined on the partitioning column, certain join efficiencies may be realized as described in co-pending U.S. Pat. No. 6,944,633, entitled Performing a Join in a Partitioned Database System, by Lawrence H. Higa, Paul L. Sinclair, Mark William Sirek, and Kuorong Chiang, filed on Dec. 10, 2003.

Joins between partitioned tables 505 and 515 may also be optimized where the partitioning functions, although not the same, are similar. Two partitioning functions are similar if the following conditions are both true:

The two partitioning functions are not the same; and

A mapping between the partitions for the two tables can be determined from the two partitioning functions such that the partitions associated with one table map to the partitions of the other table but not to all of the partitions associated with the other table. Partitioning expressions that are linearly increasing or that are defined by modulo arithmetic are examples of such cases.

In one implementation of joining partitioned table 505 and partitioned table 515, assume that tables 505 and 515 are partitioned in different, but similar manners and that the partitioning columns for tables 505 and 515 are specified in equality conditions in a join. In one case, known as the 1:1 (one-to-one) case, because tables 505 and 515 are partitioned in a similar manner, table 505 includes at least one partition $510_{1-Z}$ that corresponds to a partition $520_{1-Z}$ associated with table 515. For example, in a particular implementation, table 505 and table 515 may each have twelve partitions $510_{1-12}$ and $520_{1-12}$, respectively. Again, each of the twelve partitions $510_{1-12}$ associated with table 505 may correspond with the twelve months of 2001. Table 515, however, may be partitioned to include six partitions $520_{1-6}$ corresponding with the months of July through December for 2001 and six partitions $520_{7-12}$ corresponding with the months of January through June for 2002. Accordingly, only partitions $510_{7-12}$ correspond with partitions $520_{1-6}$. Although the number of partitions $510_{1-12}$ in table 505 are described as being equal to the number of partitions $520_{1-12}$ in table 515 in the above example, tables 505 and 515 need not have the same number of partitions.

In another case, known as the 1:m (one-to-many) case, joins between partitioned tables may also be optimized where a partition $510_{1-z}$ of table 505 may be matched to more than one partition $520_{1-z}$ of table 515. Thus, joins between partitioned tables 505 and 515 may be optimized where each partition $510_{1-z}$ may be matched to a discreet number of partitions $520_{1-z}$ though the partitioning expressions for each table 505 and 515 are not the same. For example, in a particular implementation, tables 505 and 515 may each include twelve partitions $510_{1-12}$ and $520_{1-12}$, respectively. Again, in a particular example, each of the twelve partitions $510_{1-12}$ of table 505 may correspond with the twelve months of 2001. For example, partition $510_1$ may include rows for orders submitted during January of 2001, partition $510_2$ may include rows for orders submitted during February of 2001, partition $510_3$ may include rows for orders submitted during March of 2001, and so on. Table 515, however, may be partitioned such that each partition $520_{1-12}$ overlaps with at least two partitions $510_{1-12}$ of table 505. For example, partition $520_1$ may include rows for orders submitted between Dec. 16, 2000 and Jan. 15, 2001, partition $520_2$ may include rows for orders submitted between Jan. 16, 2001 and Feb. 15, 2001, partition $520_3$ may include rows for orders submitted between Feb. 16, 2001 and Mar. 15, 2001, and so on. Accordingly, partition $510_1$ of table 505 at least partially matches with partitions $520_{1-2}$ of table 515. As such, there is a one-to-many relationship between partitions $510_{1-12}$ and matching partitions $520_{1-12}$. Similarly, a one-to-many relationship may exist between partitions $520_{1-2}$ and matching partitions $510_{1-2}$. In the example just described, for example, partition $520_3$, covering the period between Jan. 16, 2001 and Feb. 15, 2001 corresponds to partitions $510_1$ and $510_2$, covering January and February 2001, respectively. Although the number of partitions $510_{1-12}$ is described as being equal to the number of partitions $520_{1-12}$ in the above example, table 505 and table 515 need not have the same number of partitions.

Figure 6:
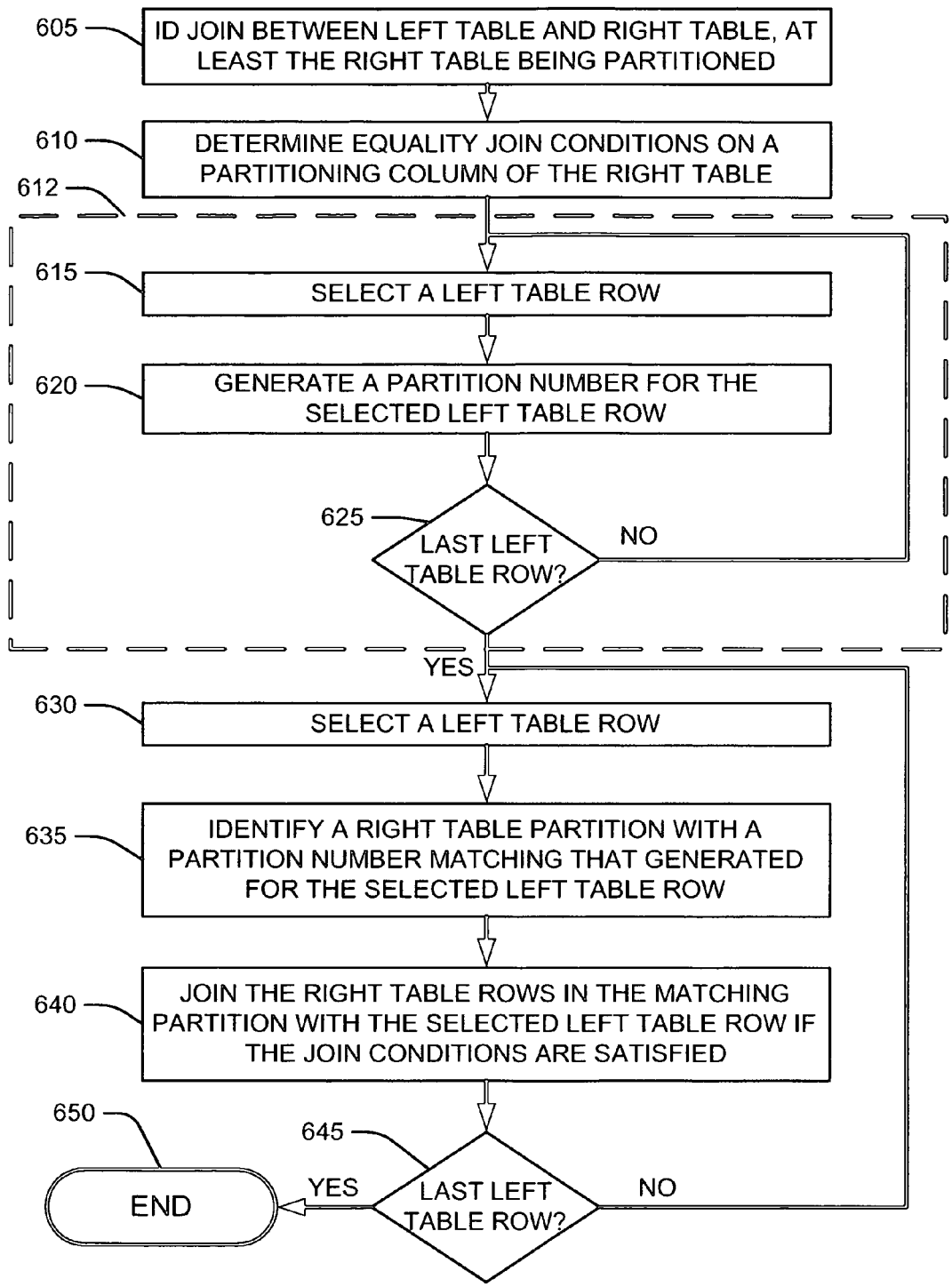
FIG. 6 illustrates a flowchart of an example method for joining a partitioned table with another table using a product join.

A system that can realize efficiencies when the partitioning functions for two tables in a join are not the same or similar, or when one of the tables is partitioned but the other is not, illustrated in FIG. 6, begins by identifying a join with a right table and a left table in which the right table is partitioned, using a partitioning function, so that each of the plurality of right table rows is grouped into one of a plurality of right table partitions (block 605). The left table includes one or more left table rows and may or may not be partitioned. The system determines that a partitioning column of the right table is specified in an equality condition of the join (block 610). The system then prepares the left table for joining one or more rows of the left table with one or more rows of the right table (block 612). Preparing the left table (block 612) includes selecting one of the plurality of left table rows (block 615) and generating a partition number for the selected one of the plurality of left table rows (block 620). If any left table rows remain (block 625), the system returns to block 615 and the loop continues until all left table rows are processed. If the left table is not partitioned or if it is partitioned using a different partition function than was used to partition the right table, this step involves generating the partition number using the partition function that was used to partition the right table (block 620). If the left table's partitioning function is identical to the right table's partitioning function then the algorithm described previously for that condition will be employed.

The system then joins each left table row with the right table. It does this by selecting each left table row in turn (block 630) and identifying the right table partition with a partition number matching that generated for the selected left table row (block 635) and joining, using a product join, the right table rows in the matching partition with the selected left table row if one or more join conditions are satisfied (block 640). If all of the left table rows have been processed (block 645), the processing is complete (block 650). Otherwise, the system selects a new left table row (block 635) and repeats the processing described above.

The system may include a number of particular features in addition to those described above. For example, when preparing the left table for joining, the system may generate a spool of the left table and the actions illustrated in blocks 615–630 would be performed against the spool rather than the table itself. Further, the system may include between the two loops shown in FIG. 6 sorting the left table rows by partition number. Still further, the system may place the left table rows associated with the same partition number into a cache. In that case, joining (block 630) would include joining the right table rows in the matching partition with the each of the left table rows in the cache using a product join if one or more join conditions are satisfied. In some cases, it may be useful to duplicate the left table to each of the processing modules $110_{1 \ldots N}$ prior to joining. The join can then proceed on each processing module in parallel using the duplicate left tables.

Figure 7:
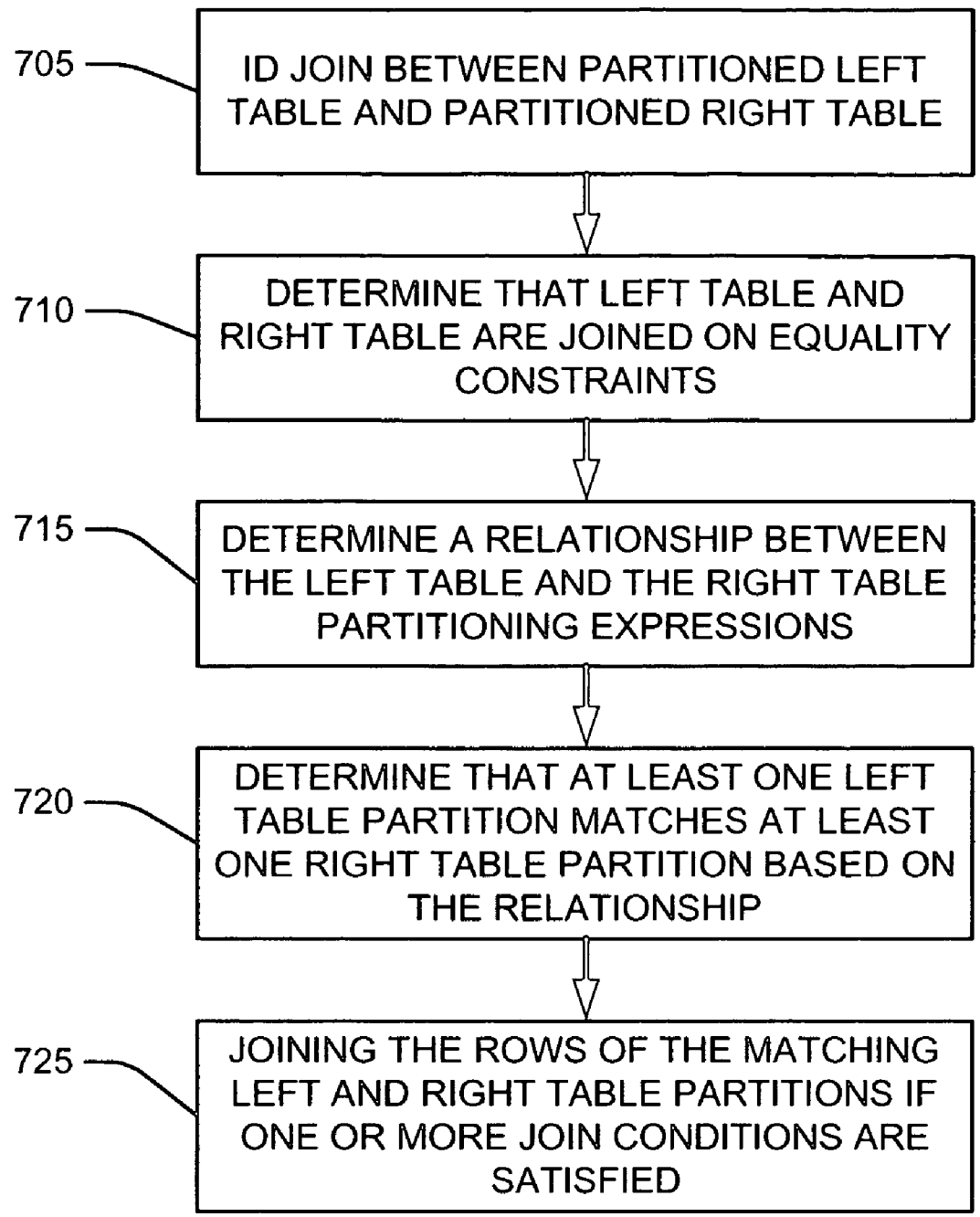
FIG. 7 illustrates a flowchart of an example method for joining two partitioned tables using a merge join with an equality constraint.

The system realizes join efficiencies under some conditions when the left table and right table are partitioned using similar (but not the same) partitioning expressions, as illustrated in FIG. 7, by first identifying a join between a left partitioned table and a right partitioned table (block 705). The system then determines that the left table and the right table are joined on equality constraints (block 710, described in more detail below with respect to FIG. 8), and that a relationship exists between the partitioning expression associated with the left table and the partitioning expression associated with the right table (block 715). The system then determines that at least one left table partition matches at least one right table partition based on the relationship between the partitioning expressions associated with the left table and right table (block 720) and joins the one or more left table rows of the matching left table partitions with the one or more right table rows of the matching right table partition if one or more join conditions are satisfied (block 725).

Figure 8:
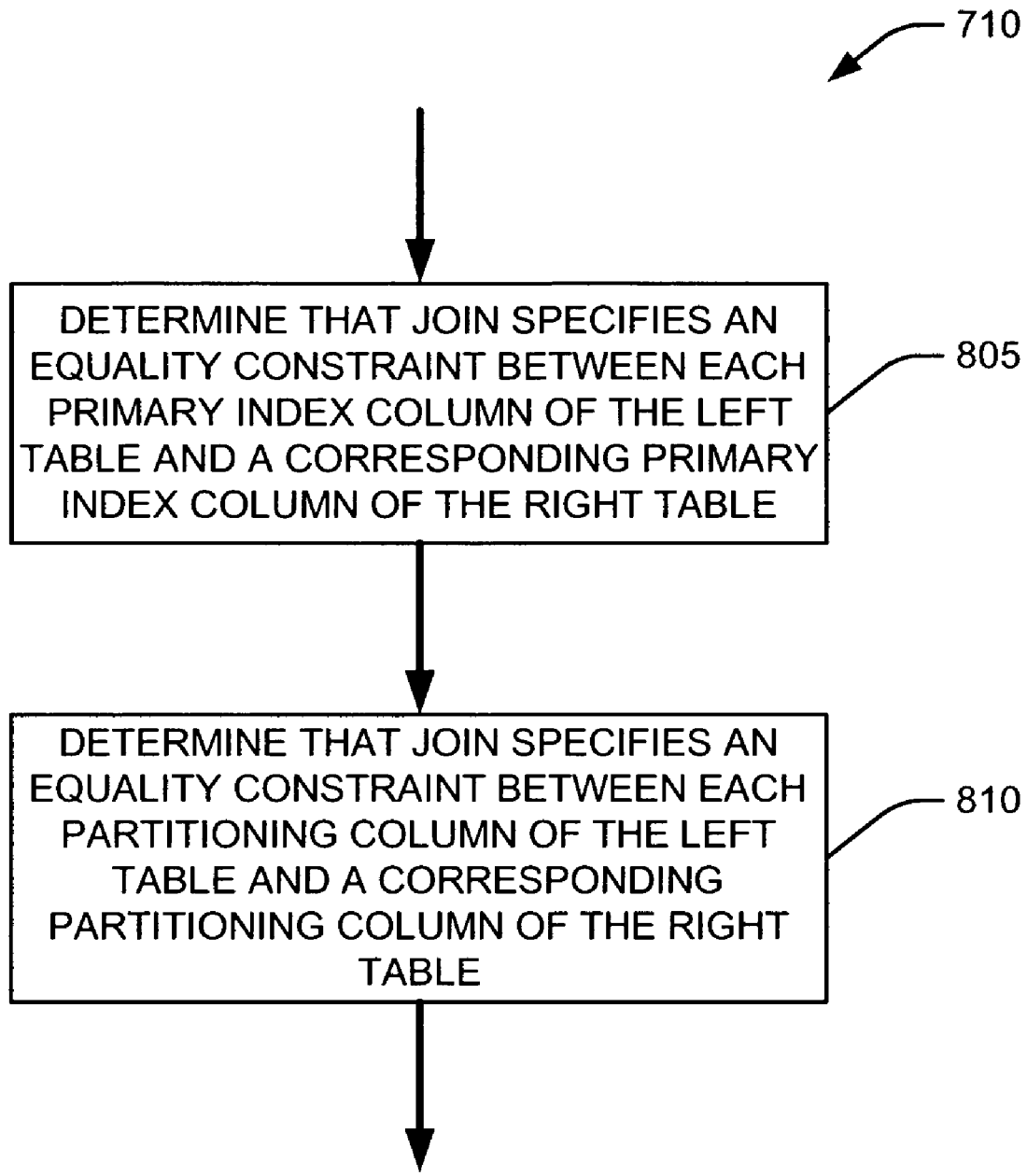
FIG. 8 illustrates a flowchart of an example method for a portion of the process for joining two partitioned tables using a merge join with an equality constraint.

Determining that the left table and the right table are joined on equality constraints (block 710) is illustrated in more detail in FIG. 8. The system first determines that the join specifies an equality constraint between each primary index column of the left table and a corresponding primary index column of the right table (block 805). The system then determines that the join specifies an equality constraint between each partitioning column of the left table and a corresponding partitioning column of the right table (block 810).

Figure 9:
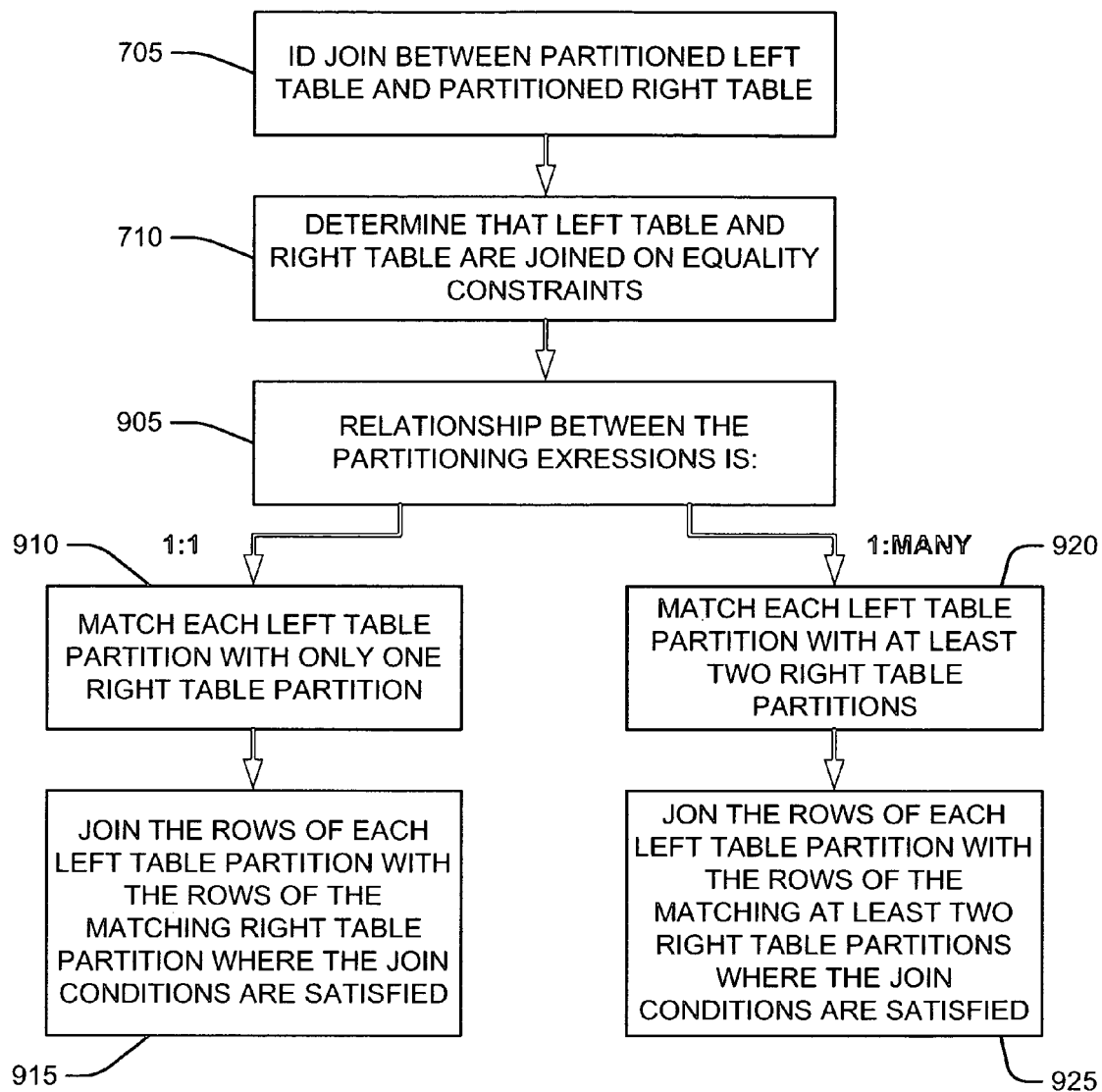
FIG. 9 illustrates a flowchart of an example method for joining two partitioned tables using a merge join with an equality constraint.

The join technique illustrated in FIG. 7 can identify a relationship between partitioning expressions that is, in effect, a mapping between the two sets of partitions. The mapping between the left and right table partitions can be a one-to-one relationship or a one-to-many relationship, as discussed above, and as illustrated in FIG. 9. After completing blocks 705 and 710, which are the same as described with respect to FIG. 7, the system determines whether the mapping of left table partitions to the right table partitions is a one-to-one relationship or a one-to-many relationship (block 905). If the mapping is one-to-one, the system matches each partition of the left table with only one partition of the right table (block 910) and performs a merge join between the matching partitions (block 915).

If, on the other hand, the mapping is one-to-many, the system matches each partition of the left table with at least two partitions of the right table (block 920) and joins the one or more left table rows of each partition of the left table with the one or more rows of the at least two matching partitions of the right table (block 925).

The one-to-many case may also be a "many-to-many" case because it is likely that at least some of the right table partitions map to more than one left table partitions. In either the one-to-many or many-to-many cases, a benefit might be achieved by performing the joins in blocks 725, 915 and 925 by applying one of the algorithms described in co-pending U.S. patent application Ser. No. 10/029,082, entitled Reduced Memory Row Hash Match Scan Join for a Partitioned Database System, by the inventors hereof, filed on Dec. 20, 2001, or U.S. patent application Ser. No. 10/106,699, entitled Row Hash Match Scan Join Using Summary Contexts for a Partitioned Database System, by Steven Cohen and Paul Sinclair, filed on Mar. 26, 2002.

The optimizer estimated cost for the one-to-one case is the same as the cost of a regular merge join between the two tables as if they were not partitioned, with some accounting for the additional CPU time to sequence through each partition of one of the tables. The optimizer estimated cost for the one-to-many and many-to-many cases is the cost for the algorithm used for the join with some accounting for the additional CPU to sequence through each set of partitions of one of the tables.

Figure 10:
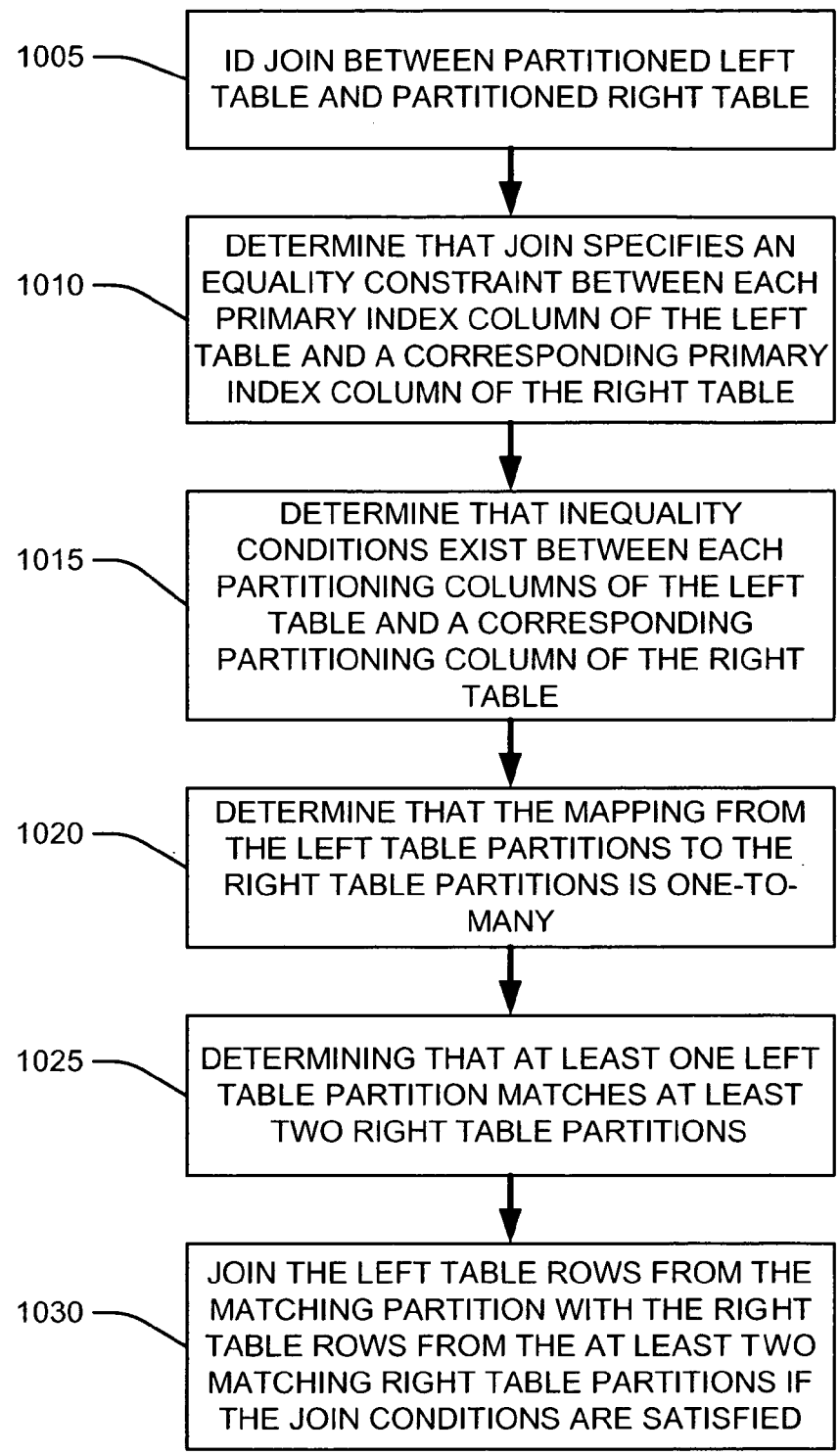
FIG. 10 illustrates a flowchart of an example method for joining two partitioned tables using a merge join with an inequality constraint.

The system employs a different technique, illustrated in FIG. 10, when the join is between partitioned left and right tables and the join specifies an inequality constraint. The system identifies a join between a partitioned left table and a partitioned right table (block 1005). The system then determines that the join specifies an equality constraint between each primary index column of the left table and a corresponding primary index column of the right table (block 1010) and determines that inequality conditions exists between each partitioning column of the left table and a corresponding partitioning column of the right table (block 1015). The system then determines that a mapping of the plurality of left table partitions to the plurality of right table partitions is a one to many relationship (block 1020) and determines that at least one left table partition matches at least two right table partitions based on the relationship between the partitioning expressions associated with the left table and right table (block 1025). Finally, the system joins the one or more left table rows of the at least one matching left table partition with the one or more right table rows of the at least two matching right table partitions if one or more join conditions are satisfied (block 1030).

In some example systems, determining that inequality conditions exist between each partitioning column of the left table and a corresponding partitioning column of the right table includes determining that the inequality conditions include one or more inequality expressions and one or more expressions that are not inequality expressions. An example of such an inequality condition is:

WHERE $t1.date < t2.date$ AND $t2.date < t1.date+7$

The inequality condition includes two inequality expressions on either side of the "AND", one of which includes an expression ("7") that is not an inequality expression.

Thus, the system and method described above permits optimized joining of a partitioned table with another table (whether or not partitioned) or a spool of an unpartitioned table. Further, the system and method described above permits optimized joining of partitioned tables where the join includes equality conditions or where the join includes inequality conditions. Additionally, the disclosed techniques may not exceed memory limitations. Since the optimizer uses a cost-based model, the optimization techniques may be costed and compared to other methods to determine the best join for the particular query. Additionally, the above described optimization techniques maximize the advantages of partitioning to improve the overall effectiveness and usefulness of the partitioning feature.

The text above describes one or more specific implementations of a broader invention. The invention is also carried out in a variety of alternative implementations and thus not limited to those directed described here. For example, while the invention has been described in terms of a database management system that uses a massively parallel processing architecture, other types of database systems and architectures, including databases having a symmetric multiprocessing architecture, are also useful in carrying out the invention. As another example, an implementation has been described with the sorting value as a hash value that is also used for distributing rows among storage facilities. Other types of sorting values are also useful in carrying out the invention. Many other implementations are also within the scope of the following claims.

What is claimed is:

1. A computer-implemented method of performing a join in a partitioned database system, the method comprising:

identifying a join that identifies a right table and a left table, the right table including a plurality of right table rows, each of the plurality of right table rows grouped into one of a plurality of right table partitions, the left table including one or more left table rows;

determining that a partitioning column of the right table is specified in an equality condition of the join;

preparing the left table for joining one or more rows of the left table with one or more rows of the right table, wherein preparing the left table comprises:

selecting one of the plurality of left table rows; and generating a partition number for the selected one of the plurality of left table rows;

for a left table row for which a partition number was generated:

identifying a right table partition with a partition number that matches the generated partition number; and joining, using a product join, the one or more right table rows in the matching partition with the selected one of the left table rows in response to determining that one or more join conditions are satisfied.

2. The method of claim 1, wherein preparing the left table for joining further comprises generating a spool of the left table.

3. The method of claim 1, wherein preparing the left table for joining further comprises:

generating a partition number for each of the plurality of left table rows; and sorting the left table rows by partition number.

4. The method of claim 3, wherein preparing the left table further comprises:

placing the left table rows associated with the same partition number into a cache.

5. The method of claim 4, further comprising:

joining, using a product join, the one or more right table rows in the matching partition with the each of the left table rows in the cache in response to determining that one or more join conditions are satisfied.

6. The method of claim 1, wherein preparing the left table for joining further comprises duplicating the left table to each of the processing modules.

7. A computer-implemented method of performing a join in a partitioned database system, the method comprising:
    identifying a join that identifies a left table and a right table, the left table including a plurality of left table rows, each of the plurality of left table rows grouped into one of a plurality of left table partitions, the right table including one or more right table rows, each of the plurality of right table rows grouped into one of a plurality of right table partitions;
    determining that the left table and the right table are joined on equality constraints;
    determining a relationship between a partitioning expression associated with the left table and a partitioning expression associated with the right table;
    determining that each left table partition matches at least one right table partition based on the relationship between the partitioning expressions associated with the left table and right table; and
    joining the one or more left table rows of each matching left table partition with the one or more right table rows of the at least one matching right table partition in response to determining that one or more join conditions are satisfied.

8. The method of claim 7, wherein determining that the left table and the right table are joined on equality constraints comprises:
    determining that the join specifies an equality constraint between each primary index column of the left table and a corresponding primary index column of the right table; and
    determining that the join specifies an equality constraint between each partitioning column of the left table and a corresponding partitioning column of the right table.

9. The method of claim 7, wherein determining the relationship between the partitioning expressions comprises:
    determining that a mapping of the plurality of left table partitions to the plurality of right table partitions is a one to one relationship.

10. The method of claim 9, wherein determining that at least one left table partition matches at least one right table partition comprises:
    matching each partition of the left table with only one partition of the right table.

11. The method of claim 9, wherein joining the one or more left table rows of the at least one matching left table partition with the one or more right table rows of the at least one matching right table partition comprises performing a merge join.

12. The method of claim 7, wherein determining a relationship between the partitioning expressions comprises:
    determining that a mapping of the plurality of left table partitions to the plurality of right table partitions is a one to many relationship.

13. The method of claim 12, wherein determining that at least one left table partition matches at least one right table partition comprises:
    matching each partition of the left table with at least two partitions of the right table.

14. The method of claim 13, wherein joining the one or more left table rows of the at least one matching left table partition with the one or more right table rows of the at least two matching right table partitions comprises:
    joining the one or more left table rows of each partition of the left table with the one or more rows of the at least two matching partitions of the right table.

15. The method of claim 7, wherein determining a relationship between the partitioning expressions comprises:
    determining that a mapping of the plurality of left table partitions to the plurality of right table partitions is a many-to-many relationship.

16. The method of claim 15, wherein determining that at least one left table partition matches at least one right table partition comprises:
    matching each partition of the left table with at least two partitions of the right table; and
    matching each partition of the right table with at least two partitions of the left table.

17. A computer-implemented method of performing a join in a partitioned database system, the method comprising:
    identifying a join that identifies a left table and a right table, the left table including a plurality of left table rows, each of the plurality of left table rows grouped into one of a plurality of left table partitions, the right table including one or more right table rows, each of the plurality of right table rows grouped into one of a plurality of right table partitions;
    determining that the join specifies an equality constraint between each primary index column of the left table and a corresponding primary index column of the right table;
    determining that inequality conditions exist between each partitioning column of the left table and a corresponding partitioning column of the right table;
    determining that a mapping of the plurality of left table partitions to the plurality of right table partitions is a one to many relationship;
    determining that at least one left table partition matches at least two right table partitions based on the relationship between the partitioning expressions associated with the left table and right table; and
    joining the one or more left table rows of the at least one matching left table partition with the one or more right table rows of the at least two matching right table partitions in response to determining that one or more join conditions are satisfied.

18. The method of claim 17, wherein determining that inequality conditions exist between each partitioning column of the left table and a corresponding partitioning column of the right table comprises:
    determining that the inequality conditions comprise one or more inequality expressions and one or more expressions that are not inequality expressions.

19. A computer-implemented method of performing a join in a partitioned database system, the method comprising:
    identifying a join that identifies a first table and a second table, the first table including a plurality of first table rows, each of the plurality of first table rows grouped into one of a plurality of first table partitions, the second table including one or more second table rows;
    determining that a partitioning column of the first table is specified in an equality condition of the join;
    preparing the second table for joining one or more rows of the second table with one or more rows of the first table, wherein preparing the second table comprises:
    selecting one of the plurality of second table rows; and
    generating a partition number for the selected one of the plurality of second table rows;
    for a second table row for which a partition number was generated:

identifying a first table partition with a partition number that matches the generated partition number;

joining, using a product join, the one or more first table rows in the matching partition with the selected one of the second table rows in response to determining that one or more join conditions are satisfied.

20. A computer program, stored on a tangible storage medium, for use in performing a join, the program including executable instructions that cause a computer to:

identify a join that identifies a right table and a left table, the right table including a plurality of right table rows, each of the plurality of right table rows grouped into one of a plurality of right table partitions, the left table including one or more left table rows;

determine that a partitioning column of the right table is specified in an equality condition of the join;

prepare the left table for joining one or more rows of the left table with one or more rows of the right table, wherein preparing the left table comprises:

select one of the plurality of left table rows; and generate a partition number for the selected one of the plurality of left table rows;

for a left table row for which a partition number was generated:

identify a right table partition with a partition number that matches the generated partition number; and join, using a product join, the one or more right table rows in the matching partition with the selected one of the left table rows in response to determining that one or more join conditions are satisfied.

21. The computer program of claim 20, wherein, when preparing the left table for joining, the computer generates a spool of the left table.

22. The computer program of claim 20, wherein, when preparing the left table for joining, the computer:

generates a partition number for each of the plurality of left table rows; and sorts the left table rows by partition number.

23. The computer program of claim 20, wherein, when preparing the left table, the computer:

places the left table rows associated with the same partition number into a cache.

24. The computer program of claim 23, further comprising executable instructions that cause the computer to:

join, using a product join, the one or more right table rows in the matching partition with the each of the left table rows in the cache in response to determining that one or more join conditions are satisfied.

25. The computer program of claim 20, wherein, when preparing the left table for joining, the computer duplicates the left table to each of the processing modules.

26. A computer program, stored on a tangible storage medium, for use in performing a join, the program including executable instructions that cause a computer to:

identify a join that identifies a left table and a right table, the left table including a plurality of left table rows, each of the plurality of left table rows grouped into one of a plurality of left table partitions, the right table including one or more right table rows, each of the plurality of right table rows grouped into one of a plurality of right table partitions;

determine that the left table and the right table are joined on equality constraints;

determine a relationship between a partitioning expression associated with the left table and a partitioning expression associated with the right table;

determine that each left table partition matches at least one right table partition based on the relationship between the partitioning expressions associated with the left table and right table; and join the one or more left table rows of each matching left table partition with the one or more right table rows of the at least one matching right table partition in response to determining that one or more join conditions are satisfied.

27. The computer program of claim 26, wherein, when determining that the left table and the right table are joined on equality constraints, the computer:

determines that the join specifies an equality constraint between each primary index column of the left table and a corresponding primary index column of the right table; and determines that the join specifies an equality constraint between each partitioning column of the left table and a corresponding partitioning column of the right table.

28. The computer program of claim 26, wherein, when determining the relationship between the partitioning expressions, the computer:

determines that a mapping of the plurality of left table partitions to the plurality of right table partitions is a one to one relationship.

29. The computer program of claim 28, wherein, when determining that at least one left table partition matches at least one right table partition, the computer:

matches each partition of the left table with only one partition of the right table.

30. The computer program of claim 28, wherein, when joining the one or more left table rows of the at least one matching left table partition with the one or more right table rows of the at least one matching right table partition, the computer performs a merge join.

31. The computer program of claim 26, wherein determining a relationship between the partitioning expressions comprises:

determining that a mapping of the plurality of left table partitions to the plurality of right table partitions is a one to many relationship.

32. The computer program of claim 31, wherein, when determining that at least one left table partition matches at least one right table partition, the computer:

matches each partition of the left table with at least two partitions of the right table.

33. The computer program of claim 32, wherein, when joining the one or more left table rows of the at least one matching left table partition with the one or more right table rows of the at least two matching right table partitions, the computer:

joins the one or more left table rows of each partition of the left table with the one or more rows of the at least two matching partitions of the right table.

34. The computer program of claim 26, wherein, when determining a relationship between the partitioning expressions, the computer:

determines that a mapping of the plurality of left table partitions to the plurality of right table partitions is a many-to-many relationship.

35. The computer program of claim 34, wherein, when determining that at least one left table partition matches at least one right table partition, the computer:

matches each partition of the left table with at least two partitions of the right table; and matches each partition of the right table with at least two partitions of the left table.

36. A computer program, stored on a tangible storage medium, for use in performing a join, the program including executable instructions that cause a computer to:

identify a join that identifies a left table and a right table, the left table including a plurality of left table rows, each of the plurality of left table rows grouped into one of a plurality of left table partitions, the right table including one or more right table rows, each of the plurality of right table rows grouped into one of a plurality of right table partitions;

determines that the join specifies an equality constraint between each primary index column of the left table and a corresponding primary index column of the right table;

determines that inequality conditions exist between each partitioning column of the left table and a corresponding partitioning column of the right table;

determines that a mapping of the plurality of left table partitions to the plurality of right table partitions is a one to many relationship;

determines that at least one left table partition matches at least two right table partitions based on the relationship between the partitioning expressions associated with the left table and right table; and joins the one or more left table rows of the at least one matching left table partition with the one or more right table rows of the at least two matching right table partitions in response to determining that one or more join conditions are satisfied.

37. The computer program of claim 36, wherein, when determining that inequality conditions exist between each partitioning column of the left table and a corresponding partitioning column of the right table, the computer:

determines that the inequality conditions comprise one or more inequality expressions and one or more expressions that are not inequality expressions.

38. A computer-implemented method of performing a join in a partitioned database system, the method comprising:

identifying a join that identifies a second table and a first table, the second table including a plurality of second table rows, each of the plurality of second table rows grouped into one of a plurality of second table partitions, the first table including one or more first table rows, each of the plurality of first table rows grouped into one of a plurality of first table partitions;

determining that the second table and the first table are joined on equality constraints;

determining a relationship between a partitioning expression associated with the second table and a partitioning expression associated with the first table;

determining that each second table partition matches at least one first table partition based on the relationship between the partitioning expressions associated with the second table and first table; and joining the one or more second table rows of each matching second table partition with the one or more first table rows of the at least one matching first table partition in response to determining that one or more join conditions are satisfied.

39. A database system including:
a massively parallel processing system including:
  one or more nodes;
  a plurality of CPUs, each of the one or more nodes providing access to one or more CPUs;
  a plurality of data storage facilities each of the one or more CPUs providing access to one or more data storage facilities;
a process for execution on the massively parallel processing system for performing a join, the process including:
  identifying a join that identifies a right table and a left table, the right table including a plurality of right table rows, each of the plurality of right table rows grouped into one of a plurality of right table partitions, the left table including one or more left table rows;
  determining that a partitioning column of the right table is specified in an equality condition of the join;
  preparing the left table for joining one or more rows of the left table with one or more rows of the right table, wherein preparing the left table comprises:
  selecting one of the plurality of left table rows; and
  generating a partition number for the selected one of the plurality of left table rows;
  for a left table row for which a partition number was generated:
    identifying a right table partition with a partition number that matches the generated partition number; and
    joining, using a product join, the one or more right table rows in the matching partition with the selected one of the left table rows in response to determining that one or more join conditions are satisfied.

40. The database system of claim 39, wherein preparing the left table for joining further comprises generating a spool of the left table.

41. The database system of claim 39, wherein preparing the left table for joining further comprises:
  generating a partition number for each of the plurality of left table rows; and
  sorting the left table rows by partition number.

42. The database system of claim 41, wherein preparing the left table further comprises:
  placing the left table rows associated with the same partition number into a cache.

43. The database system of claim 42, wherein the process further comprises:
  joining, using a product join, the one or more right table rows in the matching partition with the each of the left table rows in the cache in response to determining that one or more join conditions are satisfied.

44. The database system of claim 39, wherein preparing the left table for joining further comprises duplicating the left table to each of the processing modules.

45. A database system including:
a massively parallel processing system including:
  one or more nodes;
  a plurality of CPUs, each of the one or more nodes providing access to one or more CPUs;
  a plurality of data storage facilities each of the one or more CPUs providing access to one or more data storage facilities;
a process for execution on the massively parallel processing system for performing a join, the process including:
  identifying a join that identifies a left table and a right table, the left table including a plurality of left table rows, each of the plurality of left table rows grouped into one of a plurality of left table partitions, the right table including one or more right table rows, each of the plurality of right table rows grouped into one of a plurality of right table partitions;
  determining that the left table and the right table are joined on equality constraints;
  determining a relationship between a partitioning expression associated with the left table and a partitioning expression associated with the right table;
  determining that each left table partition matches at least one right table partition based on the relationship between the partitioning expressions associated with the left table and right table; and joining the one or more left table rows of each matching left table partition with the one or more right table rows of the at least one matching right table partition in response to determining that one or more join conditions are satisfied.

46. The database system of claim 45, wherein determining that the left table and the right table are joined on equality constraints comprises:
   determining that the join specifies an equality constraint between each primary index column of the left table and a corresponding primary index column of the right table; and
   determining that the join specifies an equality constraint between each partitioning column of the left table and a corresponding partitioning column of the right table.

47. The database system of claim 45, wherein determining the relationship between the partitioning expressions comprises:
   determining that a mapping of the plurality of left table partitions to the plurality of right table partitions is a one to one relationship.

48. The database system of claim 47, wherein determining that at least one left table partition matches at least one right table partition comprises:
   matching each partition of the left table with only one partition of the right table.

49. The database system of claim 47, wherein joining the one or more left table rows of the at least one matching left table partition with the one or more right table rows of the at least one matching right table partition comprises performing a merge join.

50. The database system of claim 45, wherein determining a relationship between the partitioning expressions comprises:
   determining that a mapping of the plurality of left table partitions to the plurality of right table partitions is a one to many relationship.

51. The database system of claim 50, wherein determining that at least one left table partition matches at least one right table partition comprises:
   matching each partition of the left table with at least two partitions of the right table.

52. The database system of claim 51, wherein joining the one or more left table rows of the at least one matching left table partition with the one or more right table rows of the at least two matching right table partitions comprises:
   joining the one or more left table rows of each partition of the left table with the one or more rows of the at least two matching partitions of the right table.

53. The database system of claim 45, wherein determining a relationship between the partitioning expressions comprises:
   determining that a mapping of the plurality of left table partitions to the plurality of right table partitions is a many-to-many relationship.

54. The database system of claim 53, wherein determining that at least one left table partition matches at least one right table partition comprises:
   matching each partition of the left table with at least two partitions of the right table; and
   matching each partition of the right table with at least two partitions of the left table.

55. A database system including:
   a massively parallel processing system including:
      one or more nodes;
      a plurality of CPUs, each of the one or more nodes providing access to one or more CPUs;
      a plurality of data storage facilities each of the one or more CPUs providing access to one or more data storage facilities;
   a process for execution on the massively parallel processing system for performing a join, the process including:
      identifying a join that identifies a left table and a right table, the left table including a plurality of left table rows, each of the plurality of left table rows grouped into one of a plurality of left table partitions, the right table including one or more right table rows, each of the plurality of right table rows grouped into one of a plurality of right table partitions;
      determining that the join specifies an equality constraint between each primary index column of the left table and a corresponding primary index column of the right table;
      determining that inequality conditions exist between each partitioning column of the left table and a corresponding partitioning column of the right table;
      determining that a mapping of the plurality of left table partitions to the plurality of right table partitions is a one to many relationship;
      determining that at least one left table partition matches at least two right table partitions based on the relationship between the partitioning expressions associated with the left table and right table; and
      joining the one or more left table rows of the at least one matching left table partition with the one or more right table rows of the at least two matching right table partitions in response to determining that one or more join conditions are satisfied.

56. The database system of claim 55, wherein determining that inequality conditions exist between each partitioning column of the left table and a corresponding partitioning column of the right table comprises:
   determining that the inequality conditions comprise one or more inequality expressions and one or more expressions that are not inequality expressions.

57. A computer-implemented method of performing a join in a partitioned database system, the method comprising:
   identifying a join that identifies a second table and a first table, the second table including a plurality of second table rows, each of the plurality of second table rows grouped into one of a plurality of second table partitions, the first table including one or more first table rows, each of the plurality of first table rows grouped into one of a plurality of first table partitions;
   determining that the join specifies an equality constraint between each primary index column of the second table and a corresponding primary index column of the first table;
   determining that inequality conditions exist between each partitioning column of the second table and a corresponding partitioning column of the first table;
   determining that a mapping of the plurality of second table partitions to the plurality of first table partitions is a one to many relationship;
   determining that at least one second table partition matches at least two first table partitions based on the relationship between the partitioning expressions associated with the second table and first table; and
   joining the one or more second table rows of the at least one matching second table partition with the one or more first table rows of the at least two matching first table partitions in response to determining that one or more join conditions are satisfied.

* * * * *